(12) United States Patent
Thorpe

(10) Patent No.: US 7,299,770 B2
(45) Date of Patent: Nov. 27, 2007

(54) EVAPORATIVE IN-CYLINDER COOLING

(76) Inventor: Douglas G. Thorpe, 707 Broadway, Irvine, KY (US) 40336

( * ) Notice: Subject to any disclaimer, the term of this patent is extended or adjusted under 35 U.S.C. 154(b) by 22 days.

(21) Appl. No.: 11/279,167

(22) Filed: Apr. 10, 2006

(65) Prior Publication Data

US 2007/0234977 A1    Oct. 11, 2007

(51) Int. Cl.
*F02B 47/02* (2006.01)
*F02F 3/00* (2006.01)

(52) U.S. Cl. ............................ 123/25 C; 123/193.6

(58) Field of Classification Search ........... 123/25 R, 123/25 C, 193.4, 193.6
See application file for complete search history.

(56) References Cited

U.S. PATENT DOCUMENTS

| | | | |
|---|---|---|---|
| 1,266,270 A * | 5/1918 | Hood | ............... 123/25 C |
| 3,731,660 A | 5/1973 | Leffert | |
| 3,760,778 A | 9/1973 | May | |
| 3,930,472 A | 1/1976 | Athenstaedt | |
| 3,964,263 A | 6/1976 | Tibbs | |
| 4,024,801 A | 5/1977 | Hudson | |
| 4,180,027 A | 12/1979 | Taylor | |
| 4,286,505 A | 9/1981 | Amdall | |
| 4,408,575 A | 10/1983 | Clairmont, Jr. et al. | |
| 4,565,162 A | 1/1986 | Seki et al. | |
| 4,608,947 A | 9/1986 | Stadler | |
| 4,617,887 A | 10/1986 | Nagase et al. | |
| 4,655,175 A * | 4/1987 | Leonard et al. | ............ 123/25 C |
| 4,667,630 A | 5/1987 | Sasaki | |
| 4,706,462 A | 11/1987 | Soltermack | |
| 4,724,800 A | 2/1988 | Wood | |
| 4,834,028 A | 5/1989 | Oetting | |
| 4,945,864 A | 8/1990 | Solomon et al. | |
| 5,031,579 A | 7/1991 | Evans | |
| 5,205,488 A | 4/1993 | Heusser | |
| 5,239,949 A | 8/1993 | Elsbett et al. | |
| 5,317,994 A | 6/1994 | Evans | |
| 6,951,193 B1 | 10/2005 | Draper | |

* cited by examiner

Primary Examiner—Noah P. Kamen
(74) Attorney, Agent, or Firm—Clyde I. Coughenour

(57) ABSTRACT

An engine is cooled using high pressure water injected into the piston with the water converted to high pressure steam by the heat from combustion with heat transfer taking place in passages in the piston and in and between grooves in the piston and the cylinder sleeve. The high pressure steam is conducted between the piston and cylinder walls to lubricate, so there will be no need for piston rings, with a part of it passing into the crankcase, and a part of it going into the combustion chamber where it contributes to power production. The piston skirt has a spring-loaded washer access to a void in a lower passage for balancing pressures.

20 Claims, 10 Drawing Sheets

EVAPORATIVE IN-CYLINDER COOLING

BACKGROUND OF THE INVENTION

1. Field of the Invention

Internal combustion engine pistons and cylinders are cooled by injecting high pressure water into pistons where it is converted into steam in the cylinder that in turn acts in part as a lubricant between the pistons and cylinder walls and in-part as a power source in the combustion chamber 2. Description of Related Art Many different schemes and devices have been used to cool internal combustion engines (ICE's). These include evaporative cooling within and outside of the engine cylinders, C. Leffert (U.S. Pat. No. 3,731,660, issued May 8, 1973), Seki et al (U.S. Pat. No. 4,565,162, issued Jan. 21, 1986), J. Evans (U.S. Pat. No. 5,031,579, issued Jul. 16, 1991), and R. Tibbs (U.S. Pat. No. 3,964,263, issued Jun. 22, 1976) are examples with H. Oetting (U.S. Pat. No. 4,834,028, issued May 30, 1989) generating steam by spraying water against the underside of the piston head and G. Soltermack (U.S. Pat. No. 4,706,462, issued Nov. 17, 1987) cools an engine and generates steam to drive a piston. Coolant and lubricant have been sprayed or injected directly against a piston with Elsbett et al (U.S. Pat. No. 5,239,949, issued Aug. 31, 1993) and J. Amdall, (U.S. Pat. No. 4,286,505, issued Sep. 1, 1986), and Clairmont Jr. et al (U.S. Pat. No. 4,408,575, issued Oct. 11, 1983), and S. Sacaki (U.S. Pat. No. 4,667,630, issued May 26, 1987) examples. S. Draper (U.S. Pat. No. 6,951,193, issued Oct. 4, 2005) teaches injecting a film of compressed gas through the cylinder walls to reduce heat transfer and to increase engine efficiency. Coolant has been conducted into the piston with H. Staddler (U.S. Pat. No. 4,608,947, issued Sep. 2, 1986), J. Solomon (U.S. Pat. No. 4,945,864, issued Aug. 7, 1990. examples. Coolant has been used to provide a non-lubricated ringless piston, C. Wood (U.S. Pat. No. 4,724,800, issued Feb. 16, 1988). Piston coolant passages have been used with G. Athenstaedt (U.S. Pat. No. 3,930,472, issued Jan. 6, 1976) and J. Taylor (U.S. Pat. No. 4,180,027, issued Dec. 25, 1979) examples.

SUMMARY OF THE INVENTION

Greatly improved (>50%) fuel economy, increased power density, and lower emissions are achieved in all internal combustion piston-engine designs using unique in-cylinder cooling technology, but it is particularly beneficial for turbocharged, 2-stroke, opposed-piston engines. This technology recovers the heat energy that is wasted in heating the cylinder wall, piston and cylinder head and returns a portion of that energy to the cylinder as useful work and it eliminates the need for engine core cooling. A high pressure water is injected into and around the piston crown. The water is routed around the circumference of the piston, through grooves and onto the cylinder walls. The waste heat in these areas evaporates and expands the water into high pressure steam. A portion of this steam is routed around and down the piston skirt to act as a lubricant and bearing surface for the reciprocatory piston, eliminating the need for a lubricant. Another portion of the steam is routed to the top of the piston past the cylinder wall, eliminating the need for piston rings, and into the combustion chamber where it contributes pressure on the piston crown to do useful work.

DESCRIPTION OF THE PREFERRED EMBODIMENTS

The technology consists of a method of injecting high pressure water within the piston crown (the top of the piston) on a gasoline or diesel engine. The water will be routed around the sides of the piston and onto the cylinder walls and head. As the high pressure water absorbs the waste heat from the piston and cylinder wall, the water converts to high pressure steam. This also results in further expanding within the combustion chamber as it absorbs radiant heat from combustion and consequently does useful work on the piston. Since the water absorbs heat that normally would be absorbed by the cylinder walls, heads, and piston, no engine core cooling is necessary. Unlike previous water induction systems designed since the 1940's, no mixing of water with the engine charge is necessary in view of carefully routing water within the piston crown and onto the cylinder walls and head. This portion of the technology could be beneficially used on every automotive and stationary ICE. By injecting high pressure water within passages below the piston crown, the water will form a gas bearing for the piston to ride on. This eliminates the need for oil lubrication. By eliminating the need for oil lubrication, a good engine designer can quickly settle on a port-fed 2-stroke engine due to its greater power density and reduced manufacturing costs as the valve train is no longer needed. A good example of such an engine is the Doxford opposed-piston engine of 1920.

Figure 1:
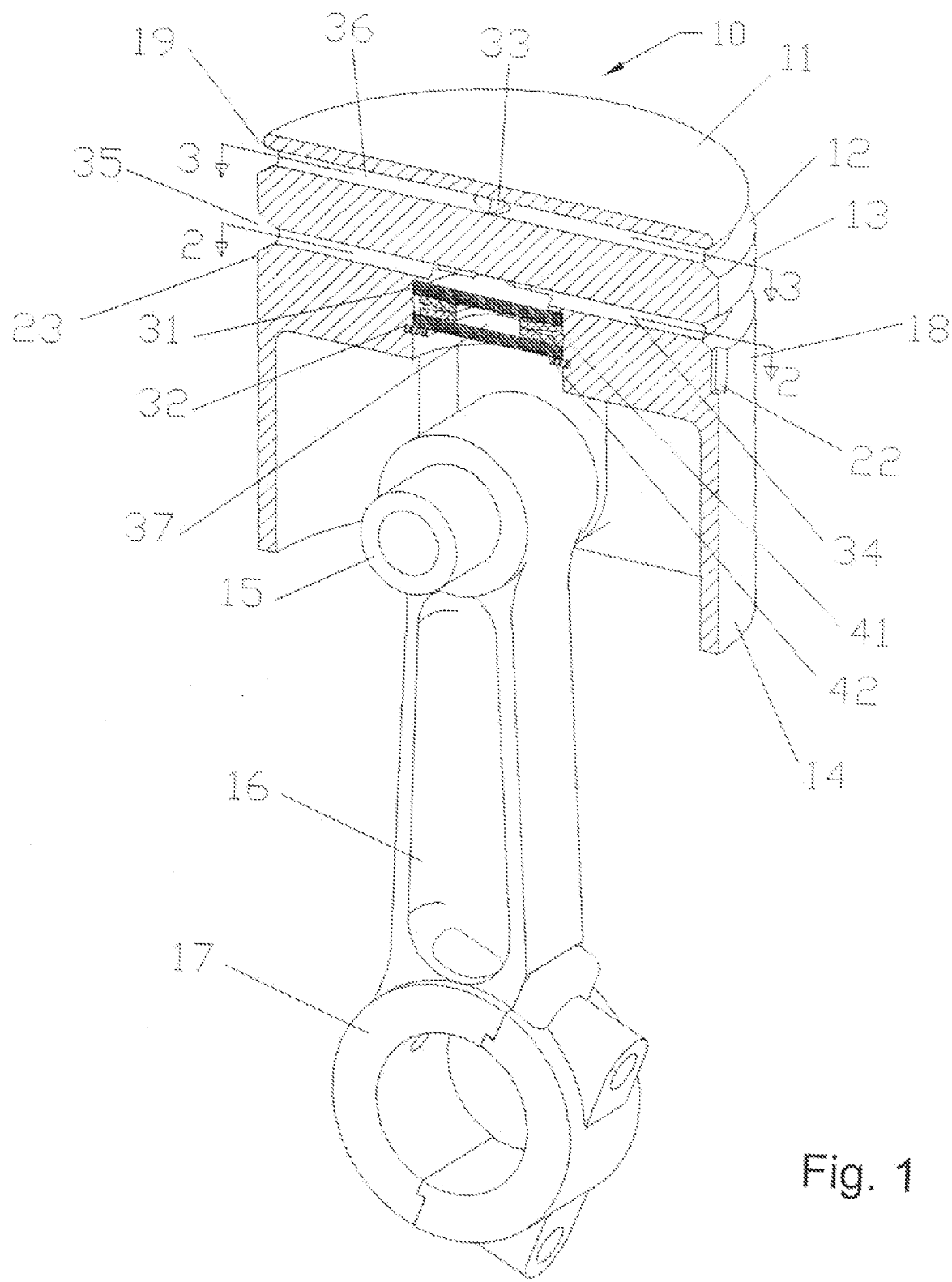
FIG. 1 is a perspective view of a piston that can be used with the invention with a cut away cross-section.

The invention is to a process and an apparatus for performing the process. FIG. 1 shows a cross-section of a piston 10 useable in performing the process. The piston 10 has a body 18 with a crown 11 and a skirt 14. There is a land 13 with the crown outer extreme 19 on the upper piston and an outer extreme 23 serving as a land on the upper body, with grooves 12, 35 between the lands. A common wrist pin 15 and connecting rod 16 are employed. In addition to these standard structural features, the piston is modified to perform high pressure water cooling. A high pressure water vertical recess 22 and high pressure passages 34, 36 are provided in the piston body into which high pressure water can be pumped and converted to steam as the piston reciprocates 29. The grooves 12, 35 and recess 22 provide access to high pressure passages 34, 36 through the piston and grooves 12, 35, around the periphery of the upper piston. An opening to the cavity 37 within the piston is in communication with the high pressure water passage 34. The cavity is provided with washers or discs 31, 32 and Belleville retainer springs 41. These washers provide access to a reservoir for an amount of water or steam to regulate pressure within the piston and cylinder. The piston also has radial access passages 33 in communication with passage 36 that conduct fluid over the breadth of the piston for heat transfer. An upper groove 12 is a supplement to groove 35 and can accommodate both high pressure water and steam and further facilitates heat transfer from the piston crown and cylinder wall. From the groove 12 high pressure steam passes between the upper piston and cylinder wall passing it into the combustion chamber around crown outer extreme 19.

The washers 31, 32 and Belleville springs 41 act as an accumulator access control to void 37. The injection of high pressure water 20 is metered and timed so that steam reaches the combustion chamber at ignition so as to confine combustion to the combustion chamber and add steam pressure to the pressure on the piston crown resulting from combustion. As this power piston stroke is limited in time, while piston movement takes place over a much longer time, it is desirable that the steam lubrication take place over the entire piston cycle. While the conversion of the water into steam takes place over of finite time to provide this lubrication, the space provided by the accumulator void 37 assists in providing a more uniform pressure. By yielding under a calculated pressure and accumulating high pressure water and/or steam in the space 37 under the washers and releasing it as steam as the pressure subsides, results in a reasonably uniform pressure within the piston. By using plural washers and two such Belleville Springs in series, the effect is multiplied in that two discs supported by two springs increases the smoothing effect. This balancing of pressures, and inherent balancing of temperatures, contributes to the ability to eliminate the cooling jackets, oil lubrication and piston rings. The steam from the crankcase vent and exhaust can be condensed for further uses. The spring tension and disc travel distance can be varied for specific applications.

Figure 2:
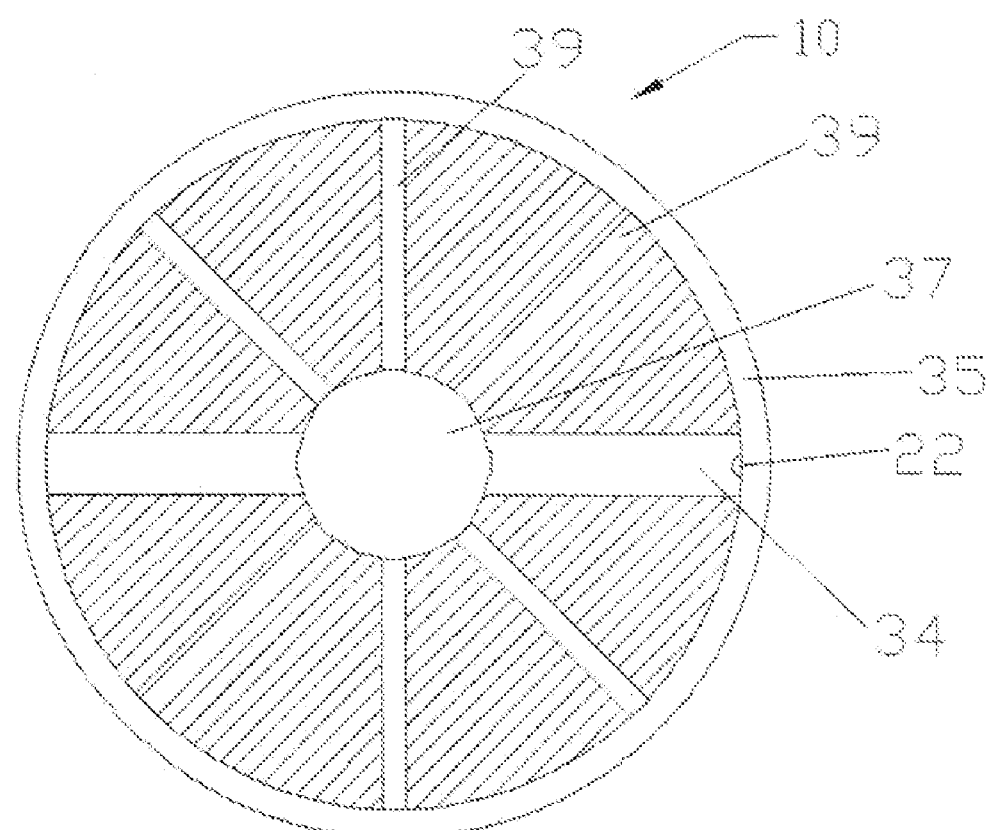
FIG. 2 is a top cross-section of the piston along the section line 2-2 of FIG. 1.

FIG. 2 is a top view of the piston 10 along the section line 2-2 of FIG. 1. It shows the lower enlarged passage 34 with adjacent recess 22 and radially extending passages 39 that extend outwardly from the central void 37. The lower passage 34 and radial passages 39 extend into groove 35.

Figure 3:
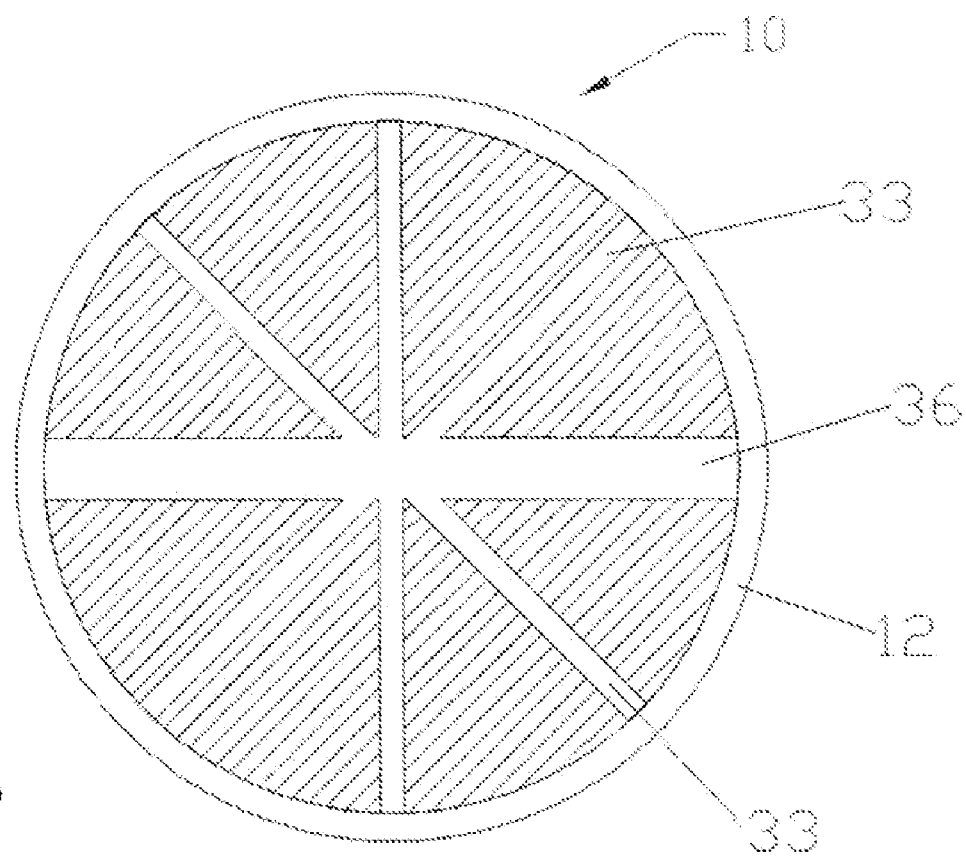
FIG. 3 is a top cross-section of the piston along the section line 3-3 of FIG. 1.

FIG. 3 is a top view of the piston 10 along the section line 3-3 of FIG. 1. It shows the upper enlarged passage 36 with radially extending passages 33 extending outwardly from the center of the piston and enlarged passage 36. The upper passage 36 and radial passages 33 extend into groove 12.

Figure 4:
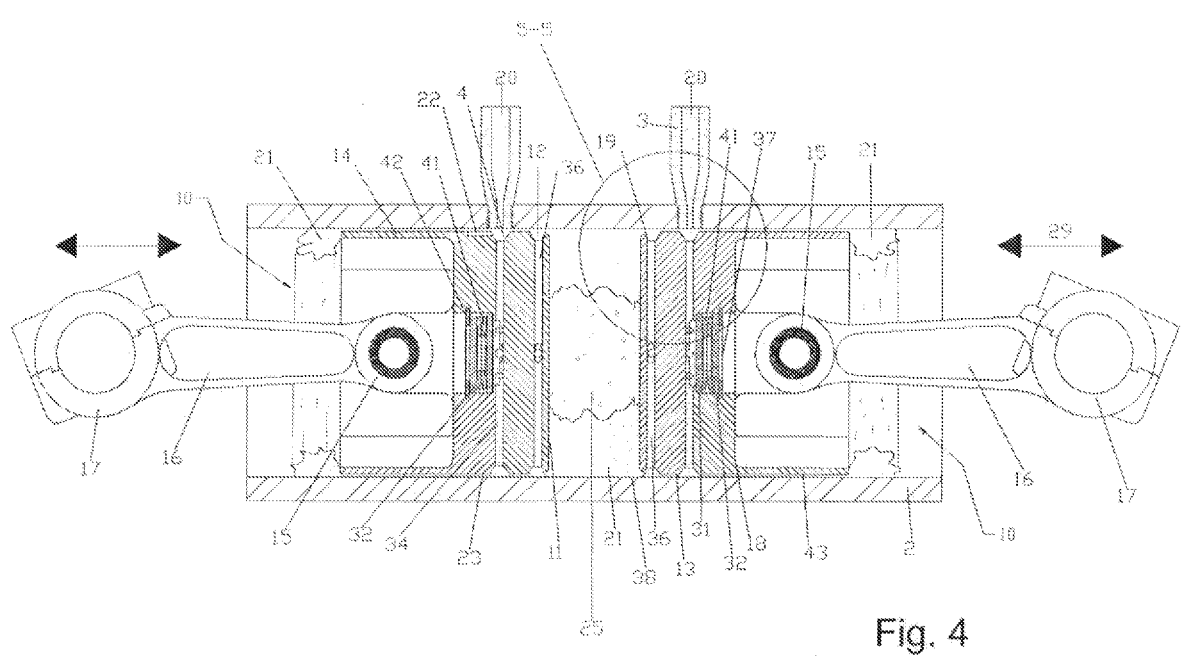
FIG. 4 is across-sectional side view of the invention pistons of FIG. 1 as used in an opposed piston engine.
Figure 5:
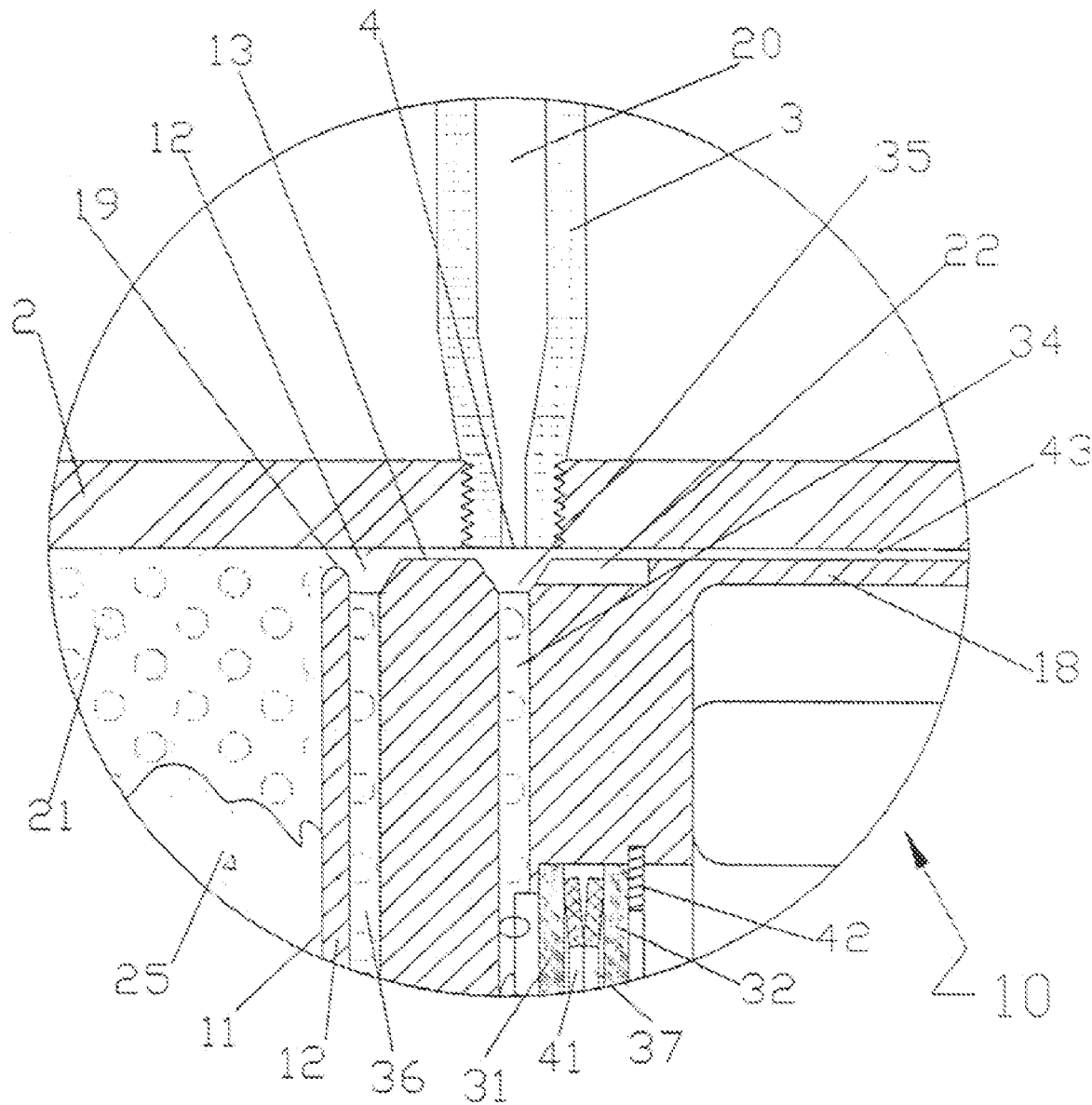
FIG. 5 is an enlarged view of the area 5-5 shown in FIG. 4.

The cooling process is shown being performed in FIG. 4. Two opposed pistons 10 are shown reciprocating within a cylinder sleeve 2 of an opposed piston internal combustion engine (ICE) 1. There are two high pressure water injectors 3 shown injecting high pressure water 20 through openings 4 in the cylinder sleeve wall 2. As the piston raises during the compression stroke, first the grove 12 and passage 36, then the groove 35 and passage 34, and then the recess 22 are exposed to the openings 4. The high pressure water injection is into the recess 22 and/or into the passage 34 and/or into the passage 36 with the timing and amount of water injected controlled to maintain the desired ratio between water and fuel. The cooling needed is related to the amount of fuel burned. The recess 22 can be added as a means of extending the water injection period. The passages 34, 36 are large relative to the volume of water injected and so the water evaporates rapidly. The water entering the recess 22 contacts the piston and cylinder walls, and enters groove 35 and passage 34. The water is evaporated by the heat of combustion conducted through the piston and cylinder wall. It is converted into high pressure steam. Some of the steam, with or without a small amount of water, passes between the piston and cylinder walls into the crankcase, exiting as steam 21. While oil lubrication of the crankshaft and connecting rod can be used, it is preferred that grease, magnetic, or "frictionless" bearings be used. The steam used to cool and to lubricate the pistons and engine parts, that enters the crankcase, can be exhausted to the atmosphere, but it is preferred that it be recycled. The blow-by is hot and clean since there are no oil or combustion products involved.

Water is evaporated as it passes between passage 34 into the groove 12 and upper passages 33, 36. The steam 21 from between the piston upper body and cylinder wall passes into the combustion chamber 38. The high pressure steam 21 joins the combustion products 25 to press on the piston crown, producing power. There is little mixing of the steam and fuel air mix in the combustion chamber. The water is injected onto and into the piston below the combustion chamber at about 15 to 30 degrees before top dead center. With an engine rotating at about 2000 RPM, the time required to fill the passages 12, 33, 36 and pass the outer crown periphery 19 into the combustion chamber has the steam reaching the combustion chamber at the time of ignition. The steam at this point is at a higher pressure than that of the fuel-air mix and presses it toward the center of the combustion chamber. When the fuel-air mix ignites, the expanding steam joins with the expanding products of combustion to push down on the piston to provide the power stroke.

Figure 6:
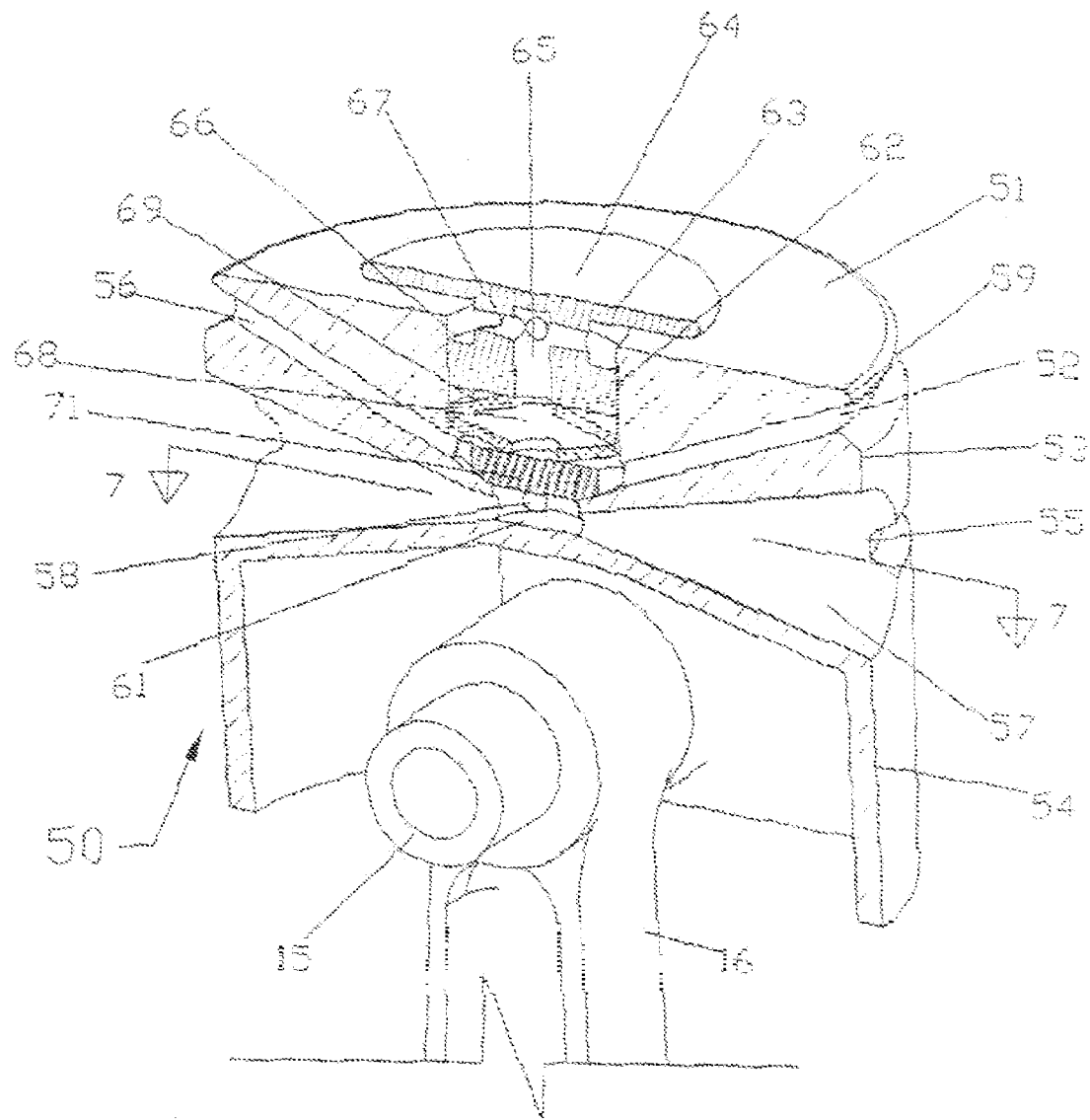
FIG. 6 is a perspective view of another piston, that can be used with the invention, with a cut away cross-section.

The embodiment shown in FIG. 6 has the same basic components as those shown in FIG. 1 except for the passages through the piston head. Rather than having the washers or discs and Belleville spring under the lower passage, with the void facing the piston skirt, they are above the lower passage with the void 68 and valve 71 above the lower passages 57, 58.

When the pressure within the lower passage raises the disc or valve 71, the void or cavity 68 above it is exposed. The void leads to diagonal passages 56 that extend from the void radially outward and upward to the outer extend of the upper groove 52 and into the steam control plug 64.

The piston 50 is provided with a conical tapered passage 57 that receives high pressure water at the large diameter outer end. The taper of the passage 57 terminates at its small diameter inner end at a lower central void 61. This lower central void communicates with lower radial passages 58 that extend into lower piston groove 55. The upper surface of the lower central void 61 is covered by a steam valve 71. The steam valve 71 is closed by a Belleville spring 69 and opened by high pressure water/steam. The steam valve 71 is shown closed in FIG. 6. The steam valve 71 opens into a cavity 68 and upper tapered radial passages 56. The tapered radial passages 56 lead into upper piston groove 52 that provides access to the combustion chamber around the outer circumference 59 of the piston crown 51. The upper cavity has an upper end closed by a steam control plug 64. The steam control plug 64 is secured into an upper plug cavity in the center of the piston by threads or other fastener. The steam control plug has a plug central passage 65 opening to the upper cavity at its lower end with radial passages 67 at the upper end of plug central passage 65. The upper end of the central plug passage 65 is closed by a radially protruding flange 63 that extends above and beyond the radial plug distribution passages 67 and upper central passage 66 that the steam control plug lower end extends into. The radially protruding flange 63 guides steam coming through the plug central passages 65 and lateral plug distribution passages 67 adjacent to the piston crown 51 radially away from the central area of the piston crown. This physical arrangement conducts steam above the piston crown into the combustion chamber upwardly from the peripheral circumference and laterally outward from a distance somewhat removed from the center of the piston crown.

Figure 7:
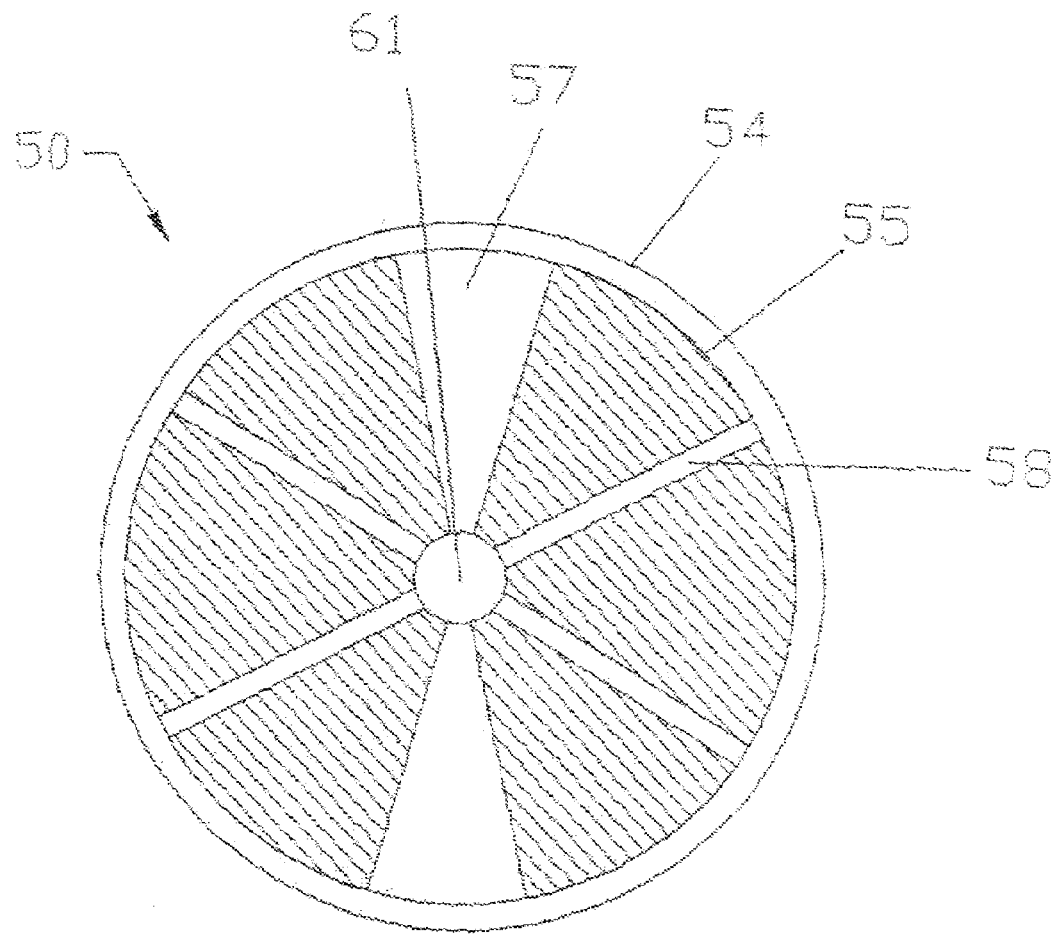
FIG. 7 is a top cross-section of the piston along the section line 7-7 of FIG. 6.

FIG. 7 is a top sectional view of the piston 50 taken along the section line 7-7 of FIG. 6. It shows the lower conical tapered passages 57 with lower radial passages 58 outwardly from the lower central void 61. Both the conical tapered passages 57 and radial passages 58 extend into the lower piston groove 55.

Figure 8:
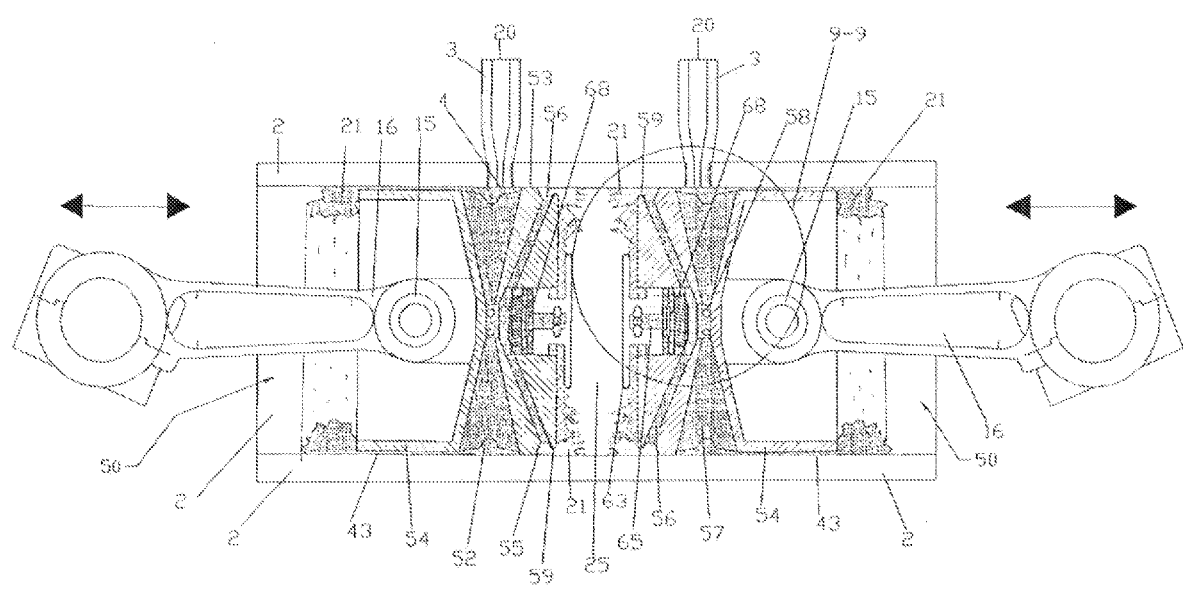
FIG. 8 is a cross-sectional side view of the invention piston of FIG. 6 as used in an opposed piston engine before ignition.

FIG. 8 shows an opposed piston engine, similar to that of FIG. 4, using pistons 50 of the type shown in FIG. 6. This figure has the pistons near the end of the compression stroke with the steam valves 71 open and steam 21 entering the combustion chamber from around the periphery 59 of the piston crown and radially from under the steam guide flange 63.

Figure 9:
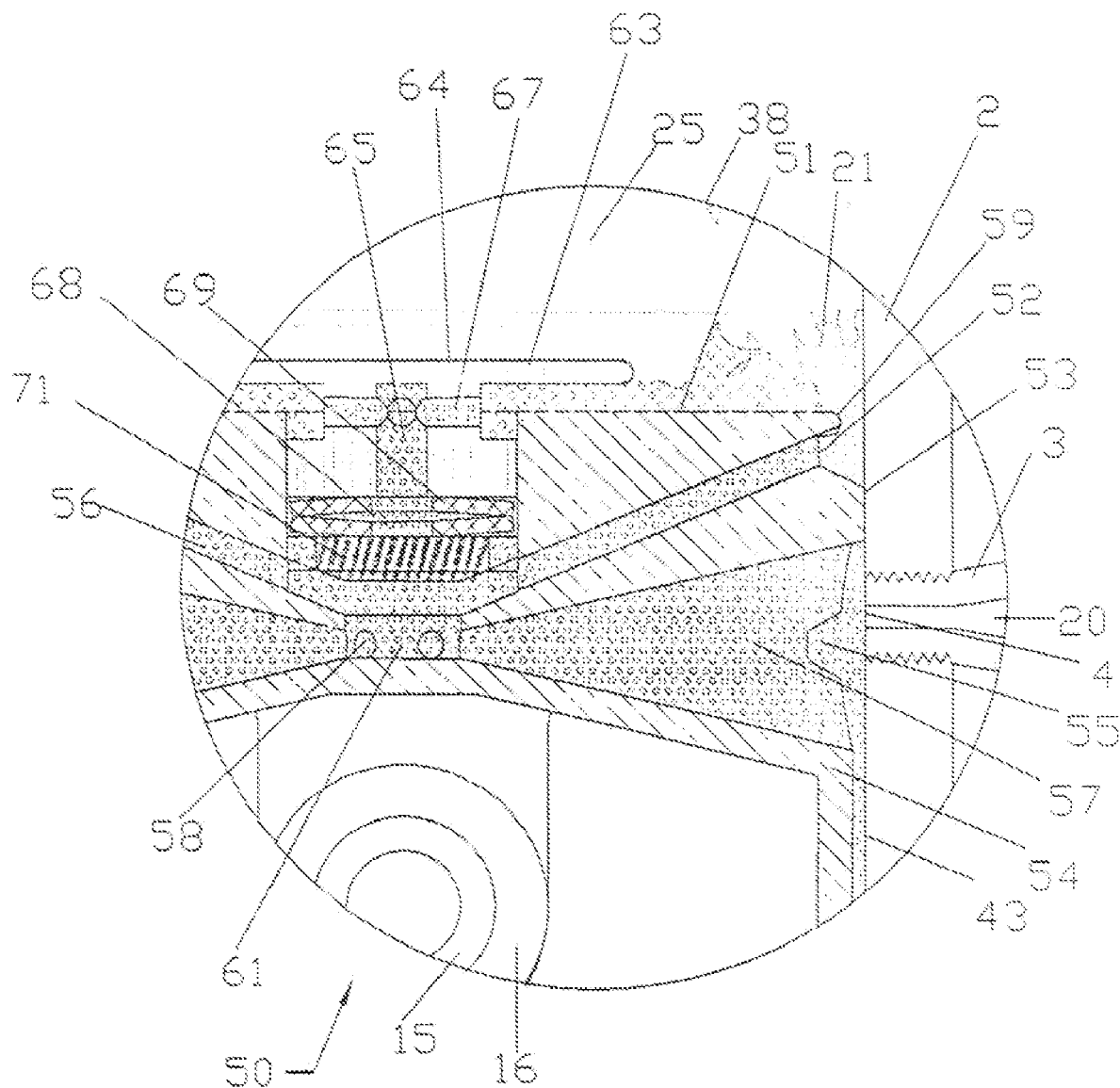
FIG. 9 is an enlarged view of the area 9-9 of FIG. 8.

FIG. 9 is a close-up showing of the area 9-9 of FIG. 8. High pressure water 20 is conducted through injector 3 through opening 4 into conical taper passage 57. The water is converted into steam as it reaches the lower central void 61 where it enters the lower radial passages 58 and into the lower piston groove 55. The high pressure steam 21 forces the steam valve 71 open against Belleville spring 69 pressure. With the steam valve 71 open, steam passes into the upper tapered radial passages 56 and into the upper piston groove 52 at the same time it passes into the plug central passage 65 through the lateral plug distribution passages 67 and under the radial steam guide flange 63 into the combustion chamber 38.

Figure 10:
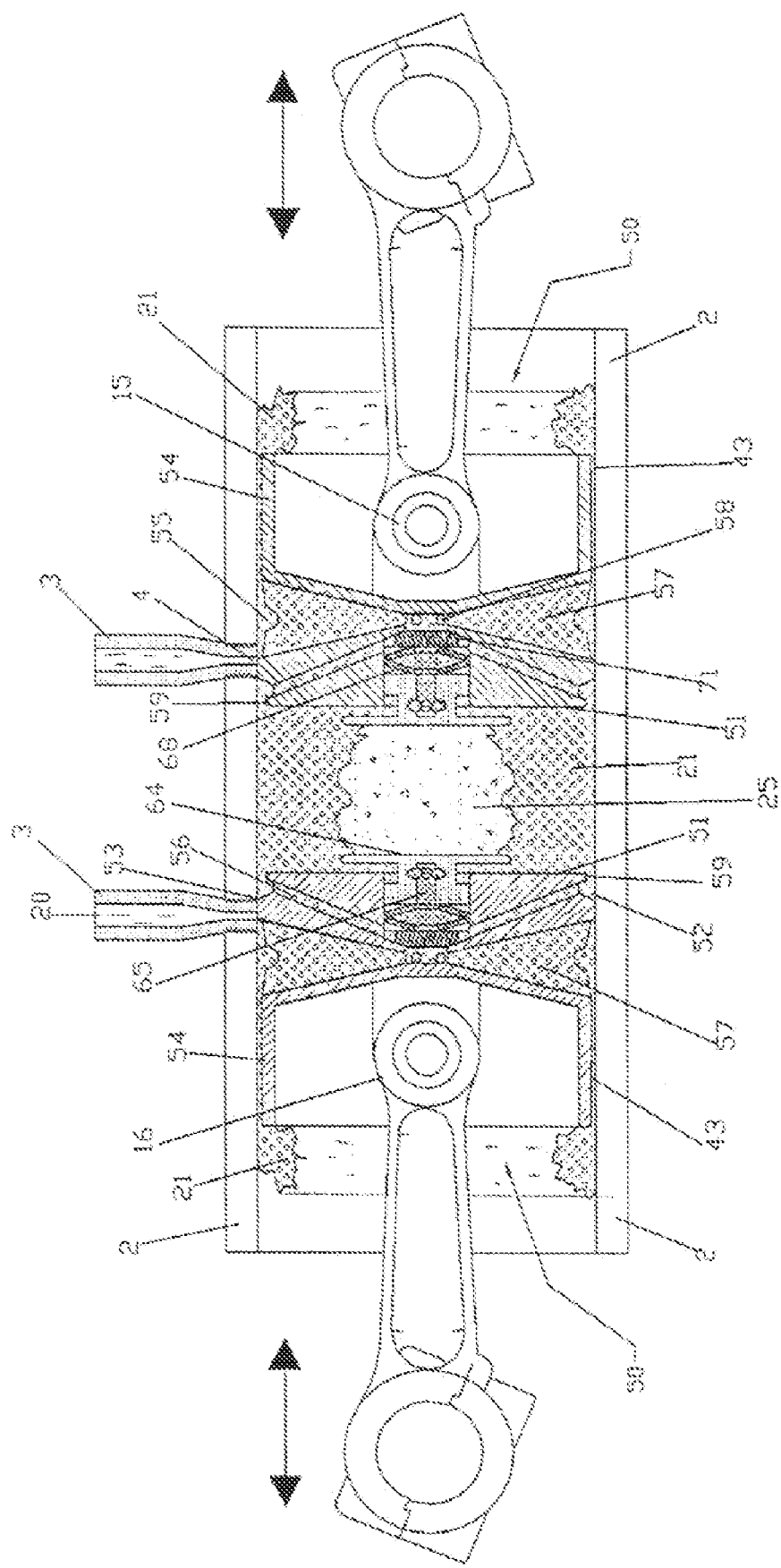
FIG. 10 is a cross-sectional side view of the opposed piston engine of FIG. 8 after ignition.

FIG. 10 shows the opposed piston engine of FIG. 8 after ignition at the beginning of the power stroke. The products of combustion and steam are forcing the pistons 50 away from each other. The steam valve 71 is closed with both spring pressure 69 and combustion chamber steam pressure 21 and combustion pressure 25 acting on the top of the steam valve to close it.

Figure 11:
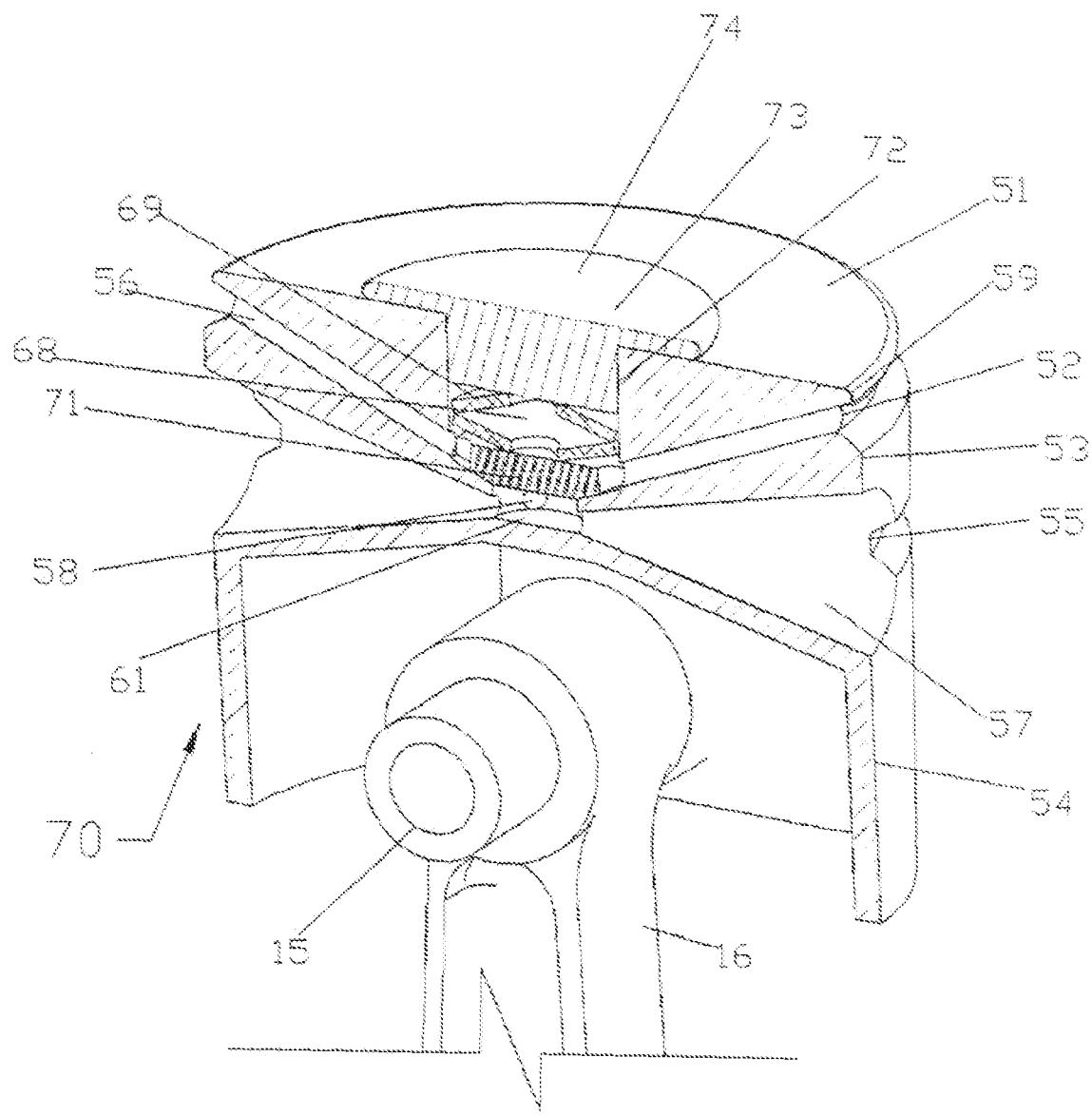
FIG. 11 is a perspective view of a modification of the piston of FIG. 6 with a cut away cross-section.

FIG. 11 is a modification of the embodiment shown in FIG. 6. The steam control plug is replaced with a solid central plug 74. The solid central plug 74 closes off the upper section of the upper cavity 68 and forms a backing for the Belleville spring 69 that presses against the steam valve 71. The steam valve 71 closes off the opening between the lower central void 61 and the upper cavity 68 and upper tapered radial passages 56 that conduct steam from the lower central void 61 into the upper piston groove 52. The upper cavity 68 performs the same function in the upper piston 70 that the cavity 37 of FIGS. 1 and 2 performs in piston 10. The peak pressures are diminished to smooth out and create a more uniform pressure throughout the cycle.

Since the piston and cylinders are cooled by the directly injected water, the temperatures are more uniform than in the standard water-jacket cooled engine, and since the pistons use the generated steam as bearings in a manner similar to air bearings, the piston clearance with the cylinder wall is less than in conventional water-jacket cooled engines. The total clearance can be from 0.400 to 1.500 mm.

The pressure within the combustion chamber normally varies from essentially 0 to over 7 mega pascal. For a diesel engine, fuel is routinely injected at from 100 to 200 mega pacal. The preferred ratio of water to fuel is 4 to 7 water to 1 fuel. It is preferred to inject the water at from 135 to 500 mega pascal for such an engine. As an example, for each power stroke, a fuel supply of 0.0038 ml would require a water supply of 0.0227 ml.

The injection of water onto the cylinder walls prevents the temperature from climbing more than the normal operating temperature in contemporary vehicles. Therefore, the injection of water onto the cylinder walls allows the proposed engine to be constructed from typical steel alloys even though it is an adiabatic engine.

To be as practical as possible, computational studies were conducted with an engine with a very modest 8.5 compression ration. When comparing the water injection 2-stroke engine with the standard cooled 4-stroke engine, a gain of 14 percentage points was found in the efficiency of the proposed 2-stroke over the cooled 4-stroke engine. The proposed 2-stroke engine was found to achieve an ISFC of 0.1777 kg/kwh when 6 times the mass of water is injected per mass of fuel. When this ISFC was compared to the standard 2-stroke ICE of 0.2663 kg/kwh an improvement of 50.4% was found. For example, a 2003 Honda Odyssey that currently gets 23 mpg would get 34.6 mpg with the proposed 2-stroke engine.

It is believed that the construction, operation and advantages of this invention will be apparent to those skilled in the art. It is to be understood that the present disclosure is illustrative only and that changes, variations, substitutions, modifications and equivalents will be readily apparent to one skilled in the art and that such may be made without departing from the spirit of the invention as defined by the following claims.

The invention claimed is:

1. A process for cooling an internal combustion engine comprising:
    injecting a high pressure water to a piston in a cylinder sleeve;
    converting said high pressure water into steam using waste heat in said piston and said cylinder sleeve;
    directing said steam between said cylinder sleeve and said piston to act as a coolant and lubricant;
    placing pressure on the crown of said piston by directing a portion of said steam toward an upper portion of said piston around said piston circumference and into a combustion chamber of said internal combustion engine;
    providing said piston with a first circumferential groove for conducting said high pressure water into heat transfer contact with said cylinder sleeve and said piston.

2. A process for cooling an internal combustion engine as in claim 1 including:
    directing a portion of said steam toward a lower portion of said piston around said piston circumference and into a crankcase of said internal combustion engine.

3. A process for cooling an internal combustion engine as in claim 1 including:
    directing a portion of said steam toward a lower portion of said piston around said piston circumference and into a crankcase of said internal combustion engine eliminating the need for piston rings.

4. A process for cooling an internal combustion engine as in claim 1 including:
    providing said piston with a vertically extending opening and lateral passage;

conducting said high pressure water into heat transfer contact within said piston using said vertically extending opening and lateral passage.

5. A process for cooling an internal combustion engine as in claim 4 including:
stabilizing and maintaining a reasonably uniform water and steam pressure by providing a cavity within said piston and selectively blocking access to said cavity using a spring loaded washer.

6. A process for cooling an internal combustion engine comprising:
injecting a high pressure water to a piston in a cylinder sleeve;
converting said high pressure water into steam using waste heat in said piston and said cylinder sleeve;
directing said steam between said cylinder sleeve and said piston to act as a coolant and lubricant;
directing a portion of said steam toward a lower portion of said piston around said piston circumference and into a crankcase of said internal combustion engine.

7. A process for cooling an internal combustion engine as in claim 6 including:
providing said piston with a first circumferential groove for conducting said high pressure water into heat transfer contact with said cylinder sleeve and said piston.

8. A process for cooling an internal combustion engine as in claim 7 including:
providing said piston with a vertically extending opening and lateral passage;
conducting said high pressure water into heat transfer contact within said piston.

9. A process for cooling an internal combustion engine as in claim 7 including:
providing said piston with internal radially extending passages to convert said high pressure water into steam.

10. A process for cooling an internal combustion engine as in claim 7 including:
providing a second circumferential groove adjacent said piston crown;
conducting steam and any remaining water into contact with said piston and said cylinder sleeve.

11. A cooled internal combustion engine cylinder comprising:
a piston for use in an internal combustion engine cylinder;
said piston having a crown on an upper end and a skirt on a lower end and a body between said crown and said skirt;
a conduit in said piston body for reception of high pressure water;
a first passage through said piston in communication with said conduit;
a first circumferential groove around said piston in communication with said first passage through said piston for conducting and converting high pressure water into steam within said piston and between said piston and an engine cylinder.

12. A cooled internal combustion engine cylinder as in claim 11 including:
a second passage through said piston;
radial passages extending from said second passage within said piston adjacent said piston crown;
a second circumferential groove extending around said piston adjacent said piston crown;
said second passage through said piston is in communication with said second circumferential groove.

13. A cooled internal combustion engine cylinder as in claim 11 including:
an opening in said first passage in said piston;
a cavity adjacent said opening;
a spring biased washer in said cavity for stabilizing pressure within said piston.

14. A cooled internal combustion engine cylinder as in claim 13 including:
a second passage through said piston;
radial passages extending from said second passage within said piston adjacent said piston crown;
a second circumferential groove extending around said piston adjacent said piston crown;
said second passage through said piston is in communication with said second circumferential groove.

15. A cooled internal combustion engine cylinder as in claim 11 wherein:
said conduit in said piston body for reception of high pressure water is a vertical recess extending from said first passage in said piston body.

16. A cooled internal combustion engine cylinder as in claim 11 including:
a cylindrical sleeve;
said piston reciprocal in said cylindrical sleeve;
an opening in said cylindrical sleeve;
an injector for forcing high pressure water through said opening in said cylindrical sleeve.

17. A cooled internal combustion engine cylinder as in claim 16 wherein:
said piston body is spaced in close proximity to said cylindrical sleeve inner surface;
a vertical recess in said piston body for reception of high pressure water;
said opening in said cylindrical sleeve is in vertical alignment with said conduit in said piston body.

18. A cooled internal combustion engine cylinder as in claim 16 wherein:
said space between said piston body and said cylindrical sleeve inner surface is from 0.400 to 1.500 mm permitting high pressure steam to pass there-between to lubricate the two and to enter the space above said piston crown.

19. A cooled internal combustion engine cylinder as in claim 18 including:
a second passage through said piston;
radial passages extending from said second passage within said piston adjacent said piston crown;
a second circumferential groove extending around said piston adjacent said piston crown;
said second passage through said piston is in communication with said second circumferential groove.

20. A cooled internal combustion engine cylinder as in claim 19 including:
an opening in said first passage in said piston;
a cavity adjacent said opening;
a spring biased washer in said cavity for stabilizing pressure within said piston.

* * * * *